United States Patent [19]

Steinreich

[11] 3,875,282

[45] Apr. 1, 1975

[54] PRODUCTION OF HIGH BULK DENSITY SPRAY DRIED HYDROUS SODIUM SILICATE

[75] Inventor: Joseph S. Steinreich, Olympia Fields, Ill.

[73] Assignee: Stauffer Chemical Co., Westport, Colo.

[22] Filed: Apr. 30, 1973

[21] Appl. No.: 355,856

[52] U.S. Cl................................. 264/118, 264/140
[51] Int. Cl............................................... B01j 2/22
[58] Field of Search.................... 264/109, 118, 140

[56] References Cited
UNITED STATES PATENTS

| | | | |
|---|---|---|---|
| 2,729,855 | 1/1956 | Titus et al.......................... | 264/109 |
| 3,520,965 | 7/1970 | Dege................................... | 264/118 |
| 3,608,083 | 9/1971 | Bunnell.............................. | 424/284 |
| 3,674,700 | 7/1972 | Gaiser................................ | 252/135 |

*Primary Examiner*—Robert F. White
*Assistant Examiner*—J. R. Hall

[57] ABSTRACT

The invention is a process for preparing high bulk density spray dried hydrous sodium silicate which comprises providing a spray dried hydrous sodium silicate having from about 13 to about 25% water, compacting the spray dried hydrous sodium silicate by the application of mechanical force to cause the particles to adhere and form articles of a higher density. The high density articles can be broken up or granulated and sized to form a material having a bulk density and particle size in the desired range.

7 Claims, No Drawings

PRODUCTION OF HIGH BULK DENSITY SPRAY DRIED HYDROUS SODIUM SILICATE

BACKGROUND OF THE INVENTION

It is known to those skilled in the art that the term sodium silicate is used to identify a variety of materials which range in chemical composition from 4 $SiO_2 \cdot Na_2O$ to $SiO_2 \cdot 2Na_2O$. Sodium silicates are produced by the fusion of silica sand and sodium carbonate or by the reaction of sodium hydroxide with silica sand. The reactants are provided in amounts required to obtain a material having the ratio of $SiO_2:Na_2O$ and the properties desired. Sodium silicates having a composition of from about 1.6 $SiO_2 \cdot Na_2O$ to about 4 $SiO_2 \cdot Na_2O$ are known as colloidal silicates. These materials are generally sold as a 20 to 50% aqueous solution called water glass. They are so named because they solidify to a glass which is water soluble.

Sodium metasilicate $Na_2SiO_3$ is a definite crystalline compound which forms various hydrates. Sodium silicates which have higher sodium oxide contents are sodium sesquisilicate ($SiO_2 \cdot 1.5Na_2O$) and sodium orthosilicate, $Na_4SiO_4$ ($SiO_2 \cdot 2Na_2O$).

The more siliceous sodium silicates are glasses. Alkaline silicates, including sodium metasilicate are crystalline materials with definite structures and characteristic properties. These are used chiefly as cleaners and detergents.

In the manufacture of sodium silicates, selected proportions of sand and sodium carbonate are charged batchwise to a regenerative tank furnace resembling that used for the manufacture of glass. Fuel is burned to maintain temperatures of about 2000° to about 2600° F. in the hot zone. Carbon dioxide is evolved as the melted materials gradually flow through the furnace.

The fused melt can be drawn from the furnace continuously and solidified by passage onto a moving chilled conveyor or into molds in which the melt cools to a semitransparent solid. The hot melt can also be contacted with a stream of water and shattered into fragments. The resulting fragments may then be charged to grinding and screening equipment to produce granular solid sodium silicates which are utilized in a wide variety of end use applications.

To obtain sodium silicates in a readily soluble form, the fragments obtained by contacting the hot melt with water are passed to a rotary dissolver. The solid material is dissolved in water at an elevated temperature. Alternatively, the hot melt from the furnace can be passed directly into water and dissolved at an elevated temperature.

Sodium silicate solutions are usually clarified by settling and then adjusted to a specific gravity in the range of about 20 to about 69 Baume. The sodium silicate solution can be used to prepare hydrated sodium silicates which are far more easily dissolved than the essentially anhydrous materials produced in the furnace.

Hydrous sodium silicate is usually prepared by drying the sodium silicate solution on heated rolls, in rotating kilns, by spray drying and the like. The use of a spray drier is often favored for this purpose. Spray driers are well known in the art. They are characterized by employment of an atomizing device which disperses a liquid or slurry feed stock in the form of droplets into a flowing hot gas stream. The hot gas stream contacts the droplets and evaporates moisture from the individual drops. The dry particles are separated from the hot gases to obtain a product in the form of small hollow spheres.

Spray drying has many advantages for the preparation of dry particulate hydrous sodium silicate. However, it is difficult to produce spray dried hydrous sodium silicate of high bulk density. Most uses especially dishwashing detergent formulations require that the particulate hydrous sodium silicate have a bulk density in the range of from about 0.40 to about 1.0 grams per cubic centimeter (26 to about 65 pounds per cubic foot). At a bulk density below about 0.40 grams per cc, particulate hydrous sodium silicate is difficult to handle since it is excessively light and fluffy. Its shipping costs are prohibitively high.

In spray drying processes, the capacity of a spray dryer increases as the inlet gas temperature to the spray dryer is increased. When sodium silicate is spray dried the use of high inlet gas temperatures to obtain a high output of dry hydrous product results in a product with a low bulk density. The bulk density of the particulate sodium silicate product becomes progressively lower as the inlet gas temperature is raised. One desiring to spray dry sodium silicate is forced to substantially reduce the output of the spray drying apparatus by lowering the inlet gas temperature in order to produce a particulate hydrous sodium silicate having a bulk density above about 0.4 grams per cubic centimeter.

The spray dried hydrous sodium silicate is in the form of small hollow spheres having a glassy surface. During the rapid drying of the small droplets in the hot gas stream in the spray dryer, the surface of the droplets becomes glazed and the droplet is forced to expand as the interior water is vaporized. Finally, holes develop and the water vapor escapes leaving a hollow sphere. U.S. Pat. No. 3,674,700 teaches that the spray dried particles can not be compacted to a higher density larger particle size material since the particles have a glass like appearance merely crush to form a dust.

It is an object of the present invention to provide a method for increasing the bulk density of spray dried hydrous sodium silicate. It is a further object of the present invention to provide a method for increasing the particle size and the bulk density of spray dried hydrous sodium silicates.

BRIEF SUMMARY OF THE INVENTION

The bulk density of particulate spray dried hydrous sodium silicate can be increased by compacting the spray dried hydrous sodium silicate into articles by application of mechanical pressure to the particulate material to cause the bulk density of the spray dried hydrous sodium silicate to increase and the particles to adhere. The compacted spray dried hydrous sodium silicate articles can be broken up and sized to a selected particle size range. The process also produces a product having a larger particle size than the initial spray dried material.

DETAILED DESCRIPTION OF THE INVENTION

Particulate spray dried hydrous sodium silicate leaves the spray dryer in the form of small hollow spheres having a glass like outer surface. The prior art discloses that the spheres can be readily broken, but the breaking of spheres forms a fine dust which cannot be compacted (see U.S. Pat. No. 3,674,700, column 2, lines 7 through 27).

It has been unexpectedly discovered that particulate spray dried hydrous sodium silicate within a particular range of $SiO_2:Na_2O$ ratio and moisture content can be compacted into articles having a larger particle size and higher bulk density by application of mechanical pressure or force to the particulate material. The mechanical force or pressure causes the particles to adhere and form articles which have a higher bulk density than the particulate spray dried material.

Spray dried particulate hydrous sodium silicate which is useful in the process of the present invention has a weight ratio of $SiO_2:Na_2O$ of from about 0.8:1 to about 4.0:1 and preferably between about 1.6:1 to about 3.0:1.

It is preferred to compact a spray dried hydrous sodium silicate having from about 13 to about 25% by weight water and most preferably between about 15 to about 22% by weight water. The physical properties of the hydrous sodium silicates may be varied by the amount of water contained therein. Usually the weight percent water will be in the range of 17 to 20%. Increasing amounts of water result in lower melting points, greater plasticity and greater rates of solubility. Decreasing the amount of water in the hydrous sodium silicate results in rapidly decreasing rate of dissolution.

Particulate spray dried hydrous sodium silicate is usually produced in a form in which a major portion of the particles usually from about 70 to about 95% of the spray dried material pass through 80 mesh and from about 5 to about 30% pass through 325 mesh. All mesh sizes used herein are in the U.S. Sieve Series. In the process of compacting the spray dried hydrous sodium silicate the particles are caused to adhere and the articles produced are usually in a size range larger than the spray dried materials.

The spray dried hydrous sodium silicates can be produced in a range of bulk densities from about 5 pounds per cubic foot to about 40 to 50 pounds per cubic foot. The higher bulk densities can be produced only at a great sacrifice in spray drier capacity. To produce high bulk density material, the inlet gas temperature of the spray drier must be reduced. When the inlet gas temperature of the spray drier is reduced, the capacity of the spray drier is reduced. Table I illustrates the effect of spray drying inlet gas temperature on the bulk density of the product prepared from a sodium silicate with a $SiO_2:Na_2O$ weight ratio of 2:1.

bulk density, the particle size of the product produced at high capacities tends to be smaller.

When high bulk density material is required, spray drier capacity can be increased by providing a means to increase the particle size and bulk density of the spray dried hydrous sodium silicate product. It has been discovered that the bulk density of spray dried hydrous sodium silicate can be increased by compacting the spray dried hydrous material with sufficient mechanical pressure or force to cause the hollow spheres to be broken or deformed and for the particles to adhere to form compacted articles. Mechanical pressure or mechanical force is utilized herein to denote compaction by means of application of pressure or force to the particulate material through action of a solid member directly on the material.

The compacting can be accomplished by known means such as tableting presses, briquetting machines or by passing the particulate spray dried hydrous sodium silicate material between the nip of oppositely rotating rolls.

The spray dried hydrous sodium silicate material can be compacted by application of small to moderate amounts of pressure. The use of high compacting pressures is not harmful to the process and can increase the bulk density of the compacted material. When high compacting pressures are utilized, one must be careful not to apply the pressure at too rapid a rate or the material can overheat and fuse into a sticky glass-like material which coats the compression means and makes operation difficult.

It has been found that opposed rotating rolls provide a compacted article of suitable density. The compacted articles produced by passing between the nip of the opposed rotating rolls are in the form of a sheet or flakes between about one-sixteenth inch to about one-half inch thick which must be granulated (broken up) and size separated to produce a material in a particular size range. The compacted material can be readily broken up by commercial means such as hammer mills, cage mills, crushers, and sized by means of screens, air classifiers and the like.

As used herein, the term "compacted article" or article refers to the particular form of the compacted spray dried hydrous sodium silicate whether it is in the form of tablets, pellets, briquettes, flakes or irregular particles formed by crushing or grinding operations.

TABLE I

| Solution Number | Feed Composition (Wt.%) Sodium Silicate | $H_2O$ | Feed Rate | Gas Inlet Temp(°C) | Gas Outlet Temp(°C) | Bulk Density (gm/cc) |
|---|---|---|---|---|---|---|
| 1 | 37 | 63 | 60 ml/min | 110 | 72 | 0.86 |
| 2 | 44 | 63 | 130 ml/min | 160 | 110 | 0.82 |
| 3 | 37 | 63 | 145 ml/min | 170 | 104 | 0.76 |
| 4 | 37 | 63 | 185 ml/min | 200 | 118 | 0.67 |
| 5 | 40 | 60 | 200 ml/min | 210 | 128 | 0.54 |
| 6 | 37 | 63 | 240 ml/min | 300 | 160 | 0.05 |
| 7 | 40 | 60 | 3.5 gpm | 165 | 122 | 0.56 |
| 8 | 40 | 60 | 4.3 gpm | 175 | 123 | 0.45 |
| 9 | 40 | 60 | 6.0 gpm | 200 | 125 | 0.24 |

As can be seen, to increase the spray drier capacity it is necessary to increase the inlet gas temperature. At high inlet gas temperatures where spray drying capacity is high, a low bulk density spray dried hydrous sodium silicate material is produced. In addition to the low The compacted articles are usually crushed or ground and size separated to form a product with a bulk density above about 0.4 grams/cubic centimeter and a particle size in one or more ranges between about through 8 to on 325 mesh and preferably about through 16 on 100 mesh. The particle size range desired in the final product is not critical since it involves only a crushing and size separation operation wherein the oversized is returned to the crusher and the undersized returned and intermixed with the feed to the compacting means.

The following examples are presented to illustrate the process of the invention.

EXAMPLE 1

Spray dried hydrous sodium silicate with a ratio of $SiO_2:Na_2O$ of 2.4 and moisture content of 15% is compacted on a 75 ton, MSS, Komarek-Greaves press. The spray dried hydrous sodium silicate is 80% through 80 mesh U.S. Sieve Series with a bulk density of 29.2 pounds per cubic foot.

The 75 ton MSS, Komarek-Greaves press has opposed rotating smooth rolls 20.5 inches diameter by 4.7 inches wide. The rolls turn at 100 rpm with a force of 75,000 pounds per bearing provided by hydraulic cylinders forcing the rolls together. The product is a smooth flake 0.100 inches thick, having a density of 1.54 grams per cc. The flake is crushed to provide the following product.

BULK DENSITY: 42.8 pounds per cubic foot
CUMULATIVE SIEVE ANALYSIS: (U.S. Sieve Series)

| | |
|---|---|
| +10 | 19.3% |
| +20 | 41.9% |
| +70 | 58.4% |
| +100 | 70.2% |
| +200 | 84.3% |
| −200 | 15.7% |

EXAMPLE 2

Spray dried hdyrous sodium silicate with a ratio of $SiO_2:Na_2O$ of 2.4 and a moisture content of 15% is compacted on a 75 ton, MSS, Komarek-Greaves press. The spray dried hydrous sodium silicate is 80% through 80 mesh U.S. Sieve Series with a bulk density of 22 pounds per cubic foot. The 75 ton, MSS, Komarek-Greaves press has opposed rotating smooth rolls 20.5 inches in diameter by 4.7 inches wide. The rolls turn at 120 rpm with a maximum force of about 56,000 pounds per bearing provided by hydraulic cylinders forcing the rolls together. The product is a smooth flake 0.12 inches thick having a density of 1.71 grams per cc. The flake is crushed to provide the following product.

BULK DENSITY: 42 pounds per cubic foot
CUMULATIVE SIEVE ANALYSIS: (U.S. Sieve Series)

| | |
|---|---|
| +10 | 17.8% |
| +20 | 36.4% |
| +70 | 53.3% |
| +100 | 72.6% |
| +200 | 84.9% |
| −200 | 15.1% |

Comparison of Experiments 1 and 2 illustrate pressure and roll rotation speeds affect the density of the compacted material. Higher rotation speeds can provide a higher density material at lower pressures.

EXAMPLE 3

Spray dried hydrous sodium silicate of a weight ratio of $SiO_2:Na_2O$ of 2 and a moisture content of 16.5% is compacted on a Komarek-Greaves CS 25 ton press. Spray dried hydrous sodium silicate is 81% through 80 mesh U.S. Sieve Series with a bulk density of 13.5 pounds per cubic foot. The CS 25 ton Komarek-Greaves press has opposed rotating corrugated rolls 9 inches in diameter by 2.5 inches wide. The rolls turn at 75 rpm with a maximum force of 4,000 pounds per bearing applied by hydraulic cylinders forcing the rolls together. The gap between the rolls is one-eighth inch. The product is a ⅛ inch thick flake having a density of 1.5 grams per cc. The flake is crushed, size separated with the undersized returning to the press. The product is through 16 on 40 mesh with a bulk density of 40.1 pounds per cubic foot.

EXAMPLE 4

Spray dried hydrous sodium silicate with a ratio of $SiO_2:Na_2O$ of 2 and a moisture content of 17.5% is compacted on a 25 ton CS Komarek-Greaves press. The spray dried sodium silicate is 81% through 80 mesh U.S. Sieve Series with a bulk density of 35 pounds per cubic foot. The 25 ton CS Komarek-Greaves press has opposed rotating corrugated rolls 9 inches diameter by 2.5 inches wide. The rolls turn at 66 rpm with a maximum force of 25,000 pounds per bearing provided by hydraulic cylinders forcing the rolls together. The rolls are gapped at one-eighth inch. The product is a flake one-eighth inch thick having a density of 1.73 grams per cubic cc. The flake is crushed and sized to provide a product through 16 mesh on 40 mesh with the undersized returning to the press. The bulk density of the product is 45.8 pounds per cubic foot.

The above examples illustrate that spray dried hydrous sodium silicate can be readily compacted to form a material with a relatively high density which can be broken up to provide a product within a desired particle size range and bulk density. The bulk density of the articles produced by the process is above about 0.4 gram per cubic centimeter. The maximum bulk density of the articles produced by the process is determined by the amount of pressure or force utilized to compact the material and the shape of the articles. Bulk densities in the range of about 0.85 to about 0.9 grams can be produced without difficulty. Compacted articles in a bulk density range of 0.45 to about 0.80 grams per cubic centimeter can be readily produced by the process.

What is claimed is:

1. A method of increasing the bulk density and particle size of spray dried particles of hydrous sodium silicate consisting essentially of small hollow spheres having a glassy outer surface, comprising: applying mechanical pressure to said spherical particles having a water content of about 13–25% by weight and a $SiO_2:Na_2O$ weight ratio of about 0.8:1 to 4.0:1 to form said spherical particles into compacted articles of larger size and having an increased bulk density.

2. The process of claim 1 wherein at least a portion of the compacted articles are crushed after compacting.

3. The process of claim 1 wherein at least a portion of the compacted articles are crushed and then separated into at least two particle size ranges.

4. The process of claim 1 wherein the $SiO_2:Na_2O$ ratio is from about 1.6:1 to about 3.0:1.

5. The process of claim 1 wherein the spray dried hydrous sodium silicate has a moisture content of from about 15 to 22 percent by weight.

6. The process of claim 1 wherein the mechanical pressure is applied to the spray dried hydrous sodium silicate by passing the hydrous sodium silicate between the nip of opposed rotating rolls.

7. The process of claim 1 wherein the articles are formed by briquetting.

* * * * *

Disclaimer 3,875,282.—*Joseph S. Steinreich*, Olympia Fields, Ill. PRODUCTION OF HIGH BULK DENSITY SPRAY DRIED HYDROUS SODIUM SILICATE. Patent dated Apr. 1, 1975. Disclaimer filed July 16, 1990, by the assignee, Unilever Patent Holdings BV.

Hereby enters this disclaimer to the entire term of said patent.
[ *Official Gazette December 18, 1990* ]